US007991381B1

(12) United States Patent
Dunne et al.

(10) Patent No.: US 7,991,381 B1
(45) Date of Patent: Aug. 2, 2011

(54) HIERARCHICAL TELEMATICS EMERGENCY CALL DIRECTION

(75) Inventors: Kevin F. Dunne, North Brunswick, NJ (US); James McHenry, Point Pleasant, PA (US); Mitch Lefkofsky, Rockaway, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 595 days.

(21) Appl. No.: 11/785,448

(22) Filed: Apr. 18, 2007

(51) Int. Cl.
*H04M 11/04* (2006.01)
*H04M 3/42* (2006.01)
*H04M 1/24* (2006.01)
*H04M 3/08* (2006.01)
*H04M 3/22* (2006.01)

(52) U.S. Cl. .............. 455/404.1; 455/414.1; 455/417; 379/33; 379/37; 379/45

(58) Field of Classification Search .............. 455/404.1, 455/445, 466, 403, 404.2, 414.1, 417; 379/33, 379/37, 45
See application file for complete search history.

(56) References Cited

U.S. PATENT DOCUMENTS

| | | | |
|---|---|---|---|
| 4,887,290 A | 12/1989 | Dop et al. | |
| 5,327,478 A | 7/1994 | Lebowitz | |
| 5,793,859 A * | 8/1998 | Matthews | 379/211.03 |
| 5,862,201 A | 1/1999 | Sands | |
| 5,937,355 A * | 8/1999 | Joong et al. | 455/466 |
| 6,076,028 A | 6/2000 | Donnelly et al. | |
| 6,240,285 B1 * | 5/2001 | Blum et al. | 455/404.1 |
| 6,549,770 B1 | 4/2003 | Marran | |
| 6,625,451 B1 | 9/2003 | La Medica, Jr. et al. | |
| 6,636,741 B2 * | 10/2003 | Yoshioka et al. | 455/404.2 |
| 6,996,398 B1 | 2/2006 | Powell | |
| 2001/0040887 A1 * | 11/2001 | Shtivelman et al. | 370/352 |
| 2004/0198366 A1 * | 10/2004 | Crocker et al. | 455/452.1 |
| 2005/0123102 A1 * | 6/2005 | Beason et al. | 379/45 |
| 2006/0094396 A1 * | 5/2006 | Raghuram et al. | 455/404.1 |
| 2006/0226960 A1 | 10/2006 | Pisz et al. | |
| 2008/0001733 A1 * | 1/2008 | Pinder | 340/539.18 |

OTHER PUBLICATIONS

"OnStar Technology", Mar. 26, 2007, URL: http//www.Onstar.com/us_english/jsp/explore/onstar_basics/technology.jsp#equipment, OnStar Corp.

* cited by examiner

*Primary Examiner* — Huy Phan
*Assistant Examiner* — Edd Rianne Plata
(74) *Attorney, Agent, or Firm* — McDermott Will & Emery LLP

(57) ABSTRACT

The disclosed examples of a telematics communication method involves detecting a condition signifying an emergency, and in response attempting a first wireless call directed to a call center of a telematics service provider, using a primary voice communication facility. If the first wireless call attempt fails, an attempt to complete at least one second wireless call directed to the call center is made, using one or more alternate voice communication facilities. Upon failure of the secondary call attempt(s), the method involves attempting to establish a wireless data communication with the call center, using a non-voice wireless communication facility.

10 Claims, 6 Drawing Sheets

HIERARCHICAL TELEMATICS EMERGENCY CALL DIRECTION

TECHNICAL FIELD

The present subject matter relates to techniques and equipment to initiate telematics communications, implementing a hierarchy of back-up strategies for use in the event of communications failures.

BACKGROUND

In recent years, increasingly sophisticated telematics systems have been developed to detect an emergency condition or activation, and in response, initiate a call to a call center. Systems have been developed for monitoring fixed customer premises locations or personnel at specific site as well as for vehicle applications. For motor vehicle applications, for example, an on-board system monitors one or more sensors to determine when a crash has occurred. Upon detecting a crash condition, the on-board system activates a cellular transceiver to initiate a cellular telephone call to a call center of the telematics service provider (TSP). Upon connection to the call center, the system may communicate certain data, such as location determined by global positioning satellite (GPS) processing, identification data and crash related data. After the data transmission, the call is converted to a voice call in which a TSP representative at the call center can attempt voice communication with an occupant of the vehicle. The TSP also offers mechanisms for the representative to contact emergency service personnel in the area, to respond appropriately to the incident.

With telematics communications of the type outlined above, whether for fixed location or vehicle applications, the ability to complete the emergency call to the TSP call center is of vital importance. The purpose of the telematics system is defeated if the call does not go through. A number of strategies have been developed to provide backup communication capabilities in the event that a primary communication network resource fails or is otherwise unavailable. For fixed location applications, for example, the primary resource typically is a local telephone line of the public switched telephone network (PSTN); and the backup is the cellular network. If the landline call is unsuccessful, the telematics unit automatically initiates a call to the TSP center using a cellular transceiver.

For mobile applications in vehicles, the primary communication resource is a cellular transceiver. However, more than one carrier often provides mobile service even in one geographic region. So, for mobile applications, the telematics unit may attempt a first cellular telephone call via the wireless network of one carrier/service provider; and if that call fails, then the unit will attempt a second similar cellular telephone call via the wireless network of a second different carrier/service provider using a preferred roaming list (PRL) scan algorithm. Another approach is to initiate a data session as a backup method of communications in the event the initial voice call fails; although selection of the carrier for the data session apparently has been limited to a primary wireless service provider for the location, as indicated on the PRL embedded in the communication device. It has also been suggested that the vehicular telematics unit may repeat its attempts on one carrier's cellular network, until the emergency call gets through to the TSP center.

These back-up strategies for telematics calls are not always adequate, particularly in the context of wireless communications, as they do not adequately cover enough of the reasonably anticipated failure scenarios. Previous methods for making an emergency call from a wireless device would make provisions only for wireless network failures. For example, repeated calls to a particular number through one carrier's network will experience the same communication problem unless and until the problem is cleared, whether the problem is due to a failure of the carrier's wireless facility or due to a failure of the landline network used to carry the call from the wireless domain to the TSP call center. Repeated wireless calls will repeatedly fail until the wireless network becomes accessible and/or the relevant landline communication is possible. In the context of an emergency, such as a vehicle crash, the delay in completing the notification could be disastrous to the victims.

The cause of communication problems experienced by cellular calls may be due to problems in the cellular network or problems in the landline communications between the cellular network and the TSP call center. Switching to an alternate wireless carrier network for the secondary call may avoid some cellular network issues but may not provide a path around a problem with a landline connection somewhere between the cellular carriers' networks at the crash site and the TSP call center location.

Switching to a data communication session via the wireless network of the carrier providing service for the voice call also may not address all problems. If there is a problem with the primary service provider's wireless network or its landline interface, that problem may impact data communications as well as voice communications. Depending on the location, a backup carrier on the PRL may not be available and/or the alternate carrier identified by PRL may be experiencing similar difficulties impacting both voice calls and data communications.

SUMMARY

The teachings herein improve over existing art by providing alternate communications in the event of a failure of a wireless emergency call, in a hierarchal manner intended to address more of the reasonably anticipated communication failure scenarios.

An example of a disclosed communication method involves detecting a condition signifying an emergency, and in response attempting a first wireless call directed to a call center of a telematics service provider, using a primary voice communication facility. If the first wireless call attempt fails, an attempt to complete at least one second wireless call directed to the call center is made, using one or more alternate voice communication facilities. Upon failure of the secondary call attempt(s), the method involves attempting to establish a wireless data communication with the call center, using a non-voice wireless communication facility.

The detailed example implements a hierarchy of different voice call and data communication attempts. A completed voice call will typically support both a data communication, e.g. of emergency related information, and a voice communication, e.g. to allow personnel at the call center to communicate with a person at the emergency location. Successful data communication via a non-voice facility typically enables communication of information related to the emergency to the call center. Voice calls can be attempted over a primary wireless service provider's network or facility, typically using different destination numbers for the call center so that different calls will attempt to utilize different landline facilities. Use of different landline facilities may bypass a problem impacting one landline facility. Also, different attempts may use a hierarchy of wireless facilities of various service providers to avoid problems with one or another of the wireless facilities. Data communications may utilize packet data service or text message service, such as short message service. Also, the data communications typically attempt to utilize the network resource(s) of the primary wireless service provider, although additional data communication attempts may fall back on resources of other wireless service providers, some of which may be affiliated (e.g. roaming partners with whom a home service provider has a favorable roaming arrangement) and some of which may not. Data communications may avoid problems impacting voice facilities. After the telematics unit has progressed through all of the different communications in the hierarchy, as a last resort, it can place an emergency call to a public service answering point (PSAP) e.g. by autodialing 911.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The communication strategies disclosed herein provide a series of options for backup communications, for emergency telematics calls or sessions, in a manner expected to address a variety of different failure scenarios and thus improve chances for successfully establishing communications in an emergency situation. The strategies are applicable to telematics communications utilizing wireless communication network services, particularly where such services are the primary or even the sole communications mechanism. Although applicable to fixed location telematics communications, the examples discussed below will focus on vehicle applications such as automatic crash notification.

Figure 1:
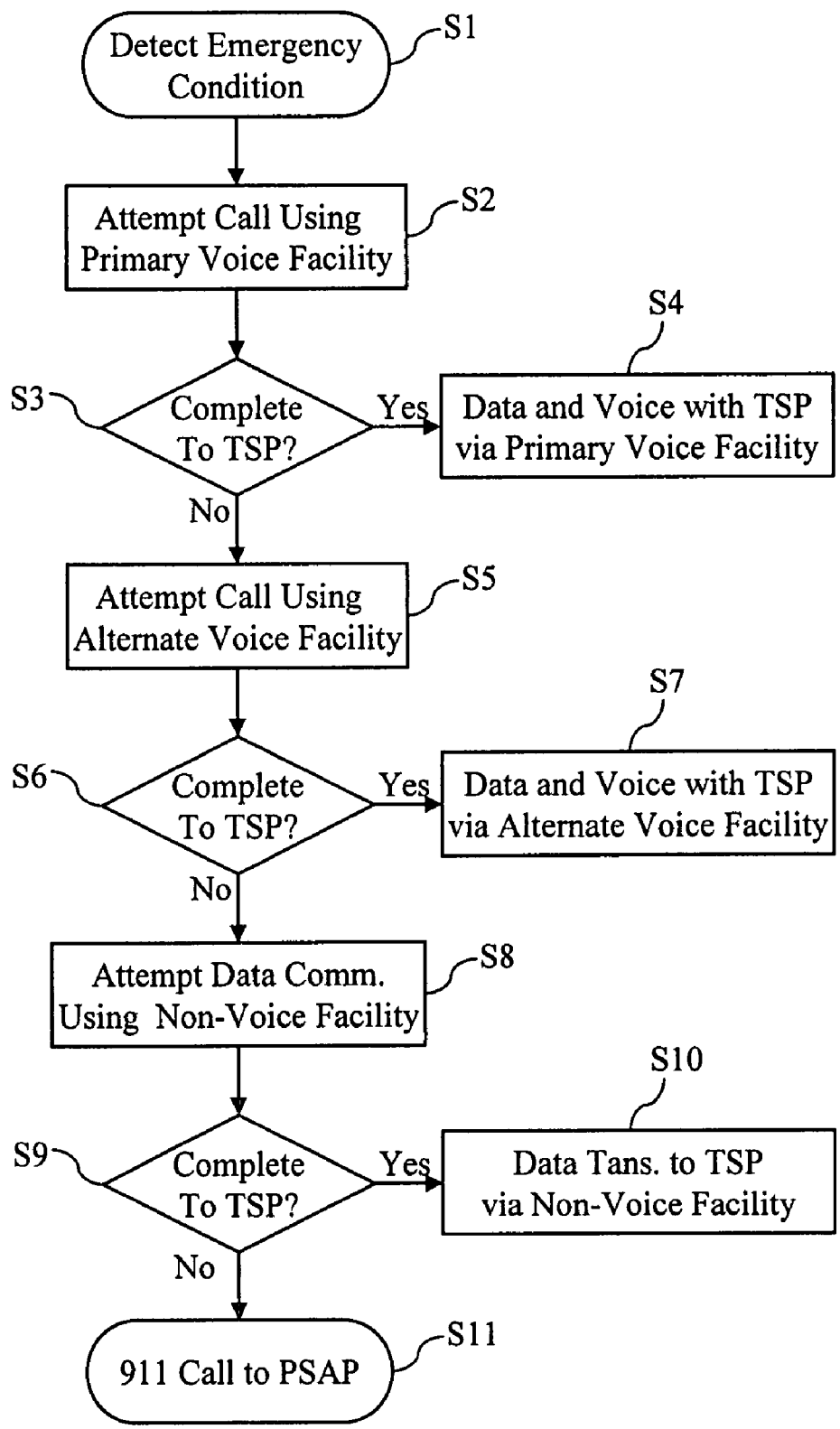
FIG. 1 is a flow chart of an emergency communication process, which may be implemented by a telematics control unit or its associated wireless network access device.

Reference now is made in detail to the examples illustrated in the accompanying drawings and discussed below. FIG. 1 illustrates the simplified logic or processing steps, which may be implemented by a telematics unit or its associated wireless transceiver in the event of an emergency condition (as detected at S1). Responsive to the detecting of the condition signifying the emergency, a first wireless call attempt is made at step S2. This first attempt is directed to a call center of a telematics service provider (TSP), and the call attempt at S2 uses a primary voice communication facility. Examples discussed more below include calls via a facility or service of a primary wireless service provider's network and/or an associated voice call connection through a first carrier's landline network. At a given location, the primary wireless service provider's network may be a system of the 'home' provider with whom the customer (user or TSP) has a subscription or the primary wireless service provider's network may be a system of an affiliate of the home provider, e.g. a roaming partner with whom the home provider has a favorable fee arrangement.

Step S3 involves determining whether or not the first wireless call attempt successfully completes the first voice call to the TSP call center. If the first call successfully reaches the TSP call center, the process flow branches to step S4. Step S4 involves data and voice communication between the telematics unit and the TSP call center via the primary voice communication facility. In a typical example, the telematics unit would initially send data relating to the emergency (e.g. identification data, data about the cause and/or severity of the emergency, current location; etc.). After the data communication, a TSP representative at the call center can conduct a voice communication with a person at the location of the telematics unit.

However, the first voice call may fail for a number of reasons. Examples include failures or congestion problems with the wireless service, problems with landline facilities, etc. Hence, assume now that the determination in step S3 indicates that the first wireless call attempt has not successfully completed the first call to the call center. In that situation, processing branches from step S3 to step S5. At S5, the processing involves another wireless call attempt from the telematics unit, in this case, to make a second wireless call directed to the call center. However, this second wireless call attempt at S5 uses an alternate voice communication facility. Examples of alternate facilities include a facility of a different wireless service provider, a call via the same provider's wireless facility but directed so as to use a different landline facility and a packet communication via facilities of the same or a different service provider where the packet communication facility supports both data communication and voice over packet communication.

At step S6, the processing involves determining whether or not the second wireless call attempt successfully completes the second call to the TSP call center. If the second call successfully reaches the TSP call center, the process flow branches to step S7. Step S7 involves data and voice communication between the telematics unit and the TSP call center, similar to that discussed above relative to S4; but the communication at S7 uses the alternate voice communication facility rather than the primary voice communication facility. Hence, if successful, the second call effectively bypasses a failure or other communication problem that impacted the primary voice communication facility and caused the failure of the first voice call attempt.

However, circumstances may arise in which the second call also fails. For example, the alternate voice communication facility also may be experiencing failures or congestion problems with the wireless service, problems with landline facilities, etc. Hence, assume now that the determination in step S6 results in a determination that the second wireless call attempt has not successfully completed the second call to the TSP call center. In that situation, processing branches from step S6 to step S8. At S8, the processing involves attempting to establish a wireless data communication from the telematics unit to the TSP call center, using a non-voice wireless communication facility. A number of different examples of data communications are described, later.

Subsequent processing at step S9 involves determining whether or not the attempt to establish wireless data communication with the call center via the non-voice facility is successful. If successful, then processing branches from step S9 to step S10 in which the telematics unit sends data related to the emergency to the TSP call center via the non-voice wireless communication facility.

However, the data communication attempt may also fail. The example is configured to offer a final fall-back to a 911 call directly to a public safety answering point (PSAP). To complete the discussion of the flow-chart, this event occurs if the determination at step S9 indicates that the data communication attempt was not successful, in which case, the process flow branches to step S11. In step S11, the telematics unit uses whatever wireless resources are available at its location to initiate an emergency call to the PSAP.

The simple example depicted in FIG. 1 assumes a single voice call via a secondary voice communication facility and a single attempt at a data communication. Those skilled in the art will recognize that the hierarchy may be expanded to provide additional voice calls and/or additional attempts at data communications via various facilities that may be available. Such a more comprehensive hierarchy expected to address a wider range of the conceivable failure scenarios is discussed later, with respect to FIGS. 4A, 4B and 5. However, before discussing the more comprehensive hierarchical scheme, it may be helpful to discuss an example of the networks that facilitate such a fail-over communication scheme and an example of a telematics unit that may be configured to implement the communication scheme in the event of an emergency.

Figure 2:
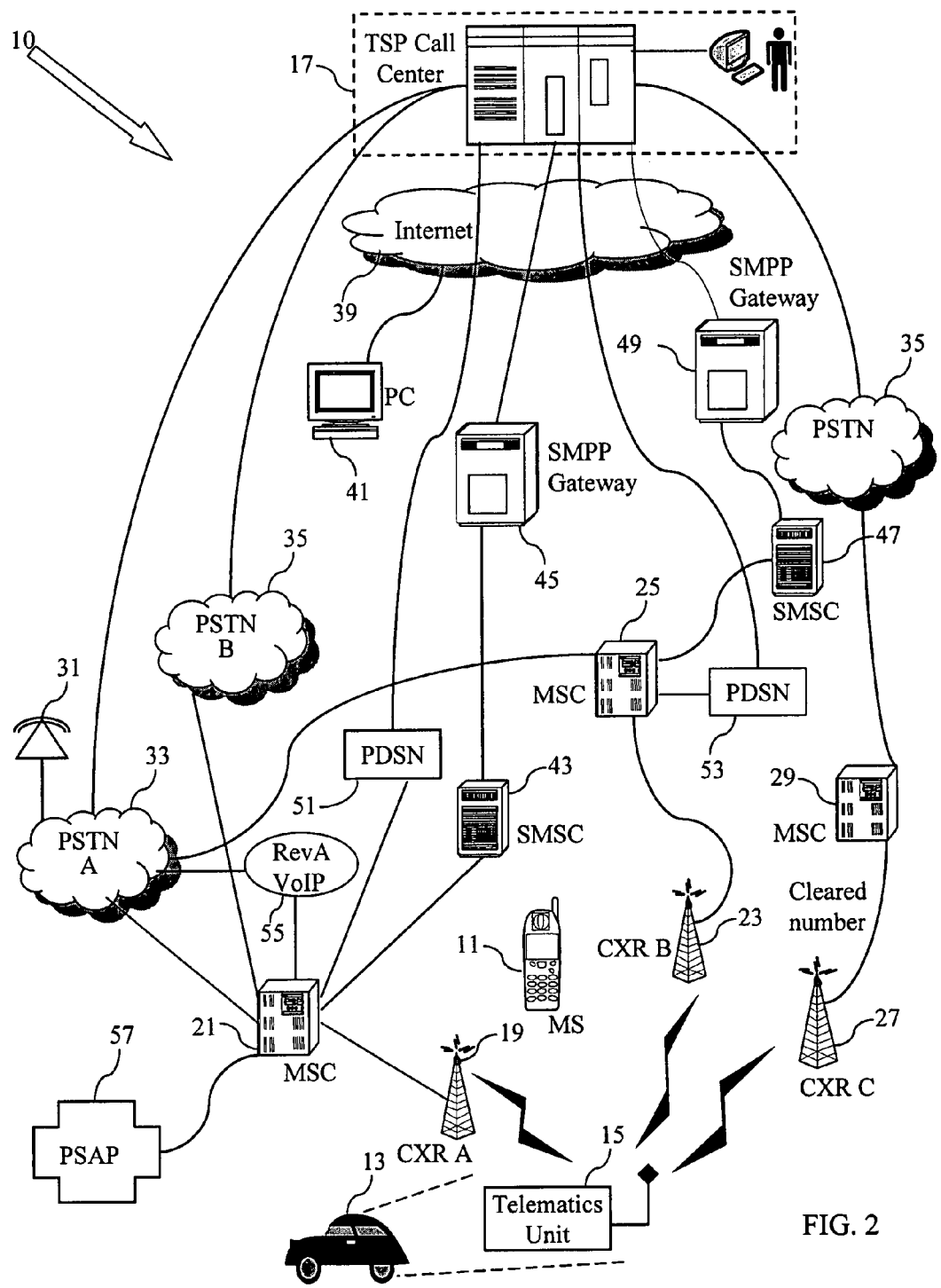
FIG. 2 is a functional block diagram of a system of networks and other equipment, for providing wireless communication services for mobile stations and for emergency telematics communications.

FIG. 2 is a functional block diagram of system 10 of networks and other equipment for providing wireless communication services for mobile stations 11, and those communications also support emergency telematics communications. Although applicable to fixed location telematics communications, the example provides such communication for vehicle applications such as automatic crash notification. Hence, the drawing shows a vehicle 13 having an associated telematics unit 15 configured for crash detection and related emergency communication functions. The emergency communications extend through an available one of the possible routes to data and voice communication equipment at a TSP call center 17. In a typical operation, the telematics unit 15 will detect a vehicle condition indicating a crash or other emergency condition of the vehicle 13 or will detect actuation of an "emergency" or "panic" button associated with the telematics unit 15 by an occupant of the vehicle. In response, the telematics unit 15 initiates a sequence of attempts to communicate through the system 10 with the TSP call center 17, e.g. in the manner discussed above relative to FIG. 1 or a manner to be discussed below relative to FIGS. 4A, 4B and 5. To fully appreciate the procedures for alternate communication attempts, in event of communication failures, particularly using the more comprehensive strategy, we will first discuss the elements of the exemplary system 10 in somewhat more detail.

In many areas today, wireless mobile communication services are provided to mobile stations 11 (and thus are expected to be available for the telematics unit 15) via communication facilities operated by a number of different wireless service providers. For discussion purposes, the vehicle 13 is shown at a location in which three different wireless service providers or carriers CXR A, CXR B and CXR C normally offer public wireless communication services.

Each wireless service provider operates a number of base stations (one of which is shown for each) and a mobile switching center (MSC), to provide mobile wireless communication services in a particular region. In the example, the first wireless service provider CXR A operates the base station 19 and the MSC 21; the second wireless service provider CXR B operates the base station 23 and the MSC 25; and the third wireless service provider CXR C operates the base station 27 and the MSC 29. Each base station 19, 23, 25 typically includes a base transceiver system which communicates via antennae of the base station and over the air-link with the mobile stations 11, when within range. To the base stations, the wireless transceiver of the telematics unit 15 appears as another mobile station. The base stations 19, 23, 25 may conform to the same or different wireless communication standards. The MSCs 21, 23, 25 provide circuit or in some cases packet switched communications to/from mobile stations 11 and other networks or elements. Each wireless service provider's network typically includes a base station controller functionality that controls the functions of a number of base stations and helps to manage how calls made by each mobile station are transferred (or "handed-off") from one serving base station to another. Each wireless network equipment vender implements this function differently. Some vendors have a physical entity, which they call a base station controller, while other vendors include this functionality as part of their MSC switch. Each service provider's facilities may offer somewhat different services, e.g. voice call, text messaging, data or various combinations of these and other services. Also, the service providers will have different agreements in place as to how to treat each others' subscribers when roaming through the various networks.

In the example, each wireless service provider's network offers voice telephone service between mobile stations as well as between a mobile station and a telephone such as 31 through the public switched telephone network (PSTN). The landline facilities of the PSTN also are operated by different parties and may actually be implemented as separate landline trunks, switches and the like. For discussion purposes, the examples show three landline PSTN facilities, 33, 35 and 37. At least the PSTN facilities 33 and 35 are different facilities (PSTN A and PSTN B), for example, as operated by different landline carriers. In the example, the MSC 21 connects to both PSTN facilities 33 and 35, whereas the MSC 25 connects to the PSTN facility 33, and the MSC 29 connects to the PSTN facility 37.

Wireless carriers have developed a text messaging service known as Short Message Service or "SMS." The SMS service transmits text messages for display on the mobile stations 11. The SMS service also offers the capability to send text messages from a mobile station 11 to another party, typically another mobile station user or via the Internet to a party using a personal computer 41. In a typical implementation, SMS communications to/from a mobile station (MS) 11 use a signaling channel over the airlink and use out-of-band signaling resources of the mobile phone network for transport to/from a server platform referred to as a SMSC (Short Message Service Center). The SMSC, for example, receives SMS or packet communications containing text messages and forwards the messages via the signaling resources and the signaling channels to the appropriate destination mobile stations. The SMSC will also receive similar messages from the mobile stations and forward them to servers or terminal devices accessible via an Internet Protocol (IP) packet data network, for example via a Short Message Peer-to-Peer Protocol (SMPP) gateway and the Internet 39.

In the example, the networks of the wireless carrier's CXR A and CXR B provide SMS service. The MSC 21 therefore has a signaling channel communication link to an SMSC 43. The SMSC 43 in turn has an IP communication link to an SMPP gateway 45, which provides' an external interface for communications via the Internet 39. In a similar fashion, the MSC 25 has a signaling channel communication link to an SMSC 47, and the SMSC 47 has an IP communication link to an SMPP gateway 49, which provides an external interface for communications via the Internet 39. Details of the signaling network communications between the MSCs and the SMSCs and of the IP switching/routing communications to and from the gateways are omitted from the drawing for simplicity, as these are conventional in nature.

Increasingly, modern implementations of public mobile wireless networks also offer packet switched type data communications services to the mobile stations 11, for example, for Internet access. The networks of carriers such as CXR A and CXR B that offer such service also include one or more Packet Data Serving Nodes or "PDSNs" 51, 53. The PDSN is a fixed network element introduced in the architecture for 3G networks, to support packet-switched data services. Data communications are set-up for a mobile station 11 through an MSC 21 or 25 to the appropriate PDSN 51 or 53, and the PDSN 51 or 53 provides packet routing to/from the Internet 39 and/or private intranets (not shown). In operation, packet services of the mobile stations are homed to one PDSN, much the same way as they are homed to one serving area, such as an area served by a particular MSC. The home PDSN serves as the station's Home Agent (HA). When roaming, another PDSN serves as a Foreign Agent (FA), in a mobile IP service implementation. The Home Agent (HA) ensures smooth seamless hand-off among various PDSNs. Although not separately shown, the networks offering packet data service will typically include an element either at the base stations or the MSCs for implementing a packet control function (PCF). The PCF function converts the radio protocols into packet protocols to allow the associated PDSN to route packets in standard packet protocols. These wireless packet data communication facilities are also available, at least for non-voice communication, for use by the telematics unit 15 in its attempts at emergency communication with the TSP call center 17.

Network facilities also are being deployed which provide all services via IP packet transport. The technology may be referred to as Evolution Data Optimized (EVDO). An EVDO network may offer data communications to/from the Internet via a PDSN, however, such networks will also offer packet transport for voice telephone services. The voice service is often referred to a Voice over IP (VoIP). In general, VoIP communications entail digitizing and compressing audio information (typically audible speech information), and dividing the resultant data stream into portions that are encapsulated into IP packets, using an appropriate higher level protocol such as transmission control protocol (TCP).

In order to do VoIP, the wireless carrier's network must be upgraded to EVDO Rev A. VoIP is a capability within the feature set of EVDO Rev A. Although shown as a separate logical path at 55, the network upgrade to Rev A is mostly software and firmware within the switch fabric of the network, but there is also a hardware upgrade to the cell sites. To complete a VoIP call, the packets must be routed through a PDSN, although such a PDSN may be implemented as a function within the MSC switch 21 itself in an EVDO Rev A upgrade. A gateway function provides conversion between VoIP protocol and protocols of the PSTN.

For 911 emergency calls from mobile stations 11, and thus for the telematics unit 15, the system 10 also includes a public safety answering point (PSAP) 57. Typically, the PSAP 57 is a call center for receiving voice calls from landline and wireless telephone stations. The PSAP typically includes data systems for determining the location of the 911 caller. For mobile network applications, each MSC switch is configured to route a 911 call from a mobile station 11 served by that switch to a PSAP 57 for the surrounding jurisdiction(s). Although all MSCs will typically be able to route calls to a PSAP, for discussion purposes the drawing shows only the link from the MSC 21 to the PSAP 57

A mobile station 11 typically utilizes a preferred roaming list (PRL) in its processing to select among available wireless communication systems, such as those of the service providers CXR A, CXR B, CXR C, particularly while roaming. A PRL enables a mobile station 11 to select preferred wireless communication service providers/networks, including for various types of services such as voice calls, data communications and SMS services. The telematics unit 15 uses a PRL in a similar manner. The PRL list identifies various systems in different services areas and for an area in which two or more systems are identified in the list, the PRL also indicates a preferred order of use. The customer typically subscribes to service with a home service provider. The identified systems in a given area may include a system of the customer's home wireless service provider and/or systems of other service providers with whom the home service provider has negotiated favorable roaming agreements, that is to say having a favorable affiliation or 'partner' arrangement with the home service provider. For purposes of this discussion, we will assume that the base station 19 and MSC 21 of CXR A are wireless facilities of the most preferred service provider identified in the PRL of the telematics unit 15. In our example, the base station 23 and MSC 25 of CXR B are facilities of a less preferred wireless service provider identified in the PRL of the telematics unit 15.

However, in many areas in the US, there are additional networks offered by other services providers that have only general agreements or obligations to complete calls of roaming mobile stations 11, and as such are not directly affiliated with the party providing wireless service for the customer or the TSP. In our example, the base station 27 and the MSC 29 of CXR C are wireless facilities of such another service provider. Rates for use of network facilities of such other unaffiliated providers are typically higher, and the facilities or systems of such other providers would not be identified in the PRL of the mobile station 11 or the telematics unit 15.

The mobile station 11 stores a copy of the PRL and checks system identifiers (SIDs) it receives from detected wireless network facilities and compares the received SIDs to the PRL data to determine which system to use at any given time. The telematics unit 15 stores and utilizes a PRL in the same way. A number of the telematics emergency communication attempts rely on use of such a PRL. Essentially, the wireless transceiver of the telematics unit detects a system identifier (SID), and the unit looks for any matching identifiers in the PRL. As will be discussed later, the more detailed hierarchy processing illustrated in FIGS. 4A, 4B and 5 starts with the most favorable facility, based both on desired communications (data and voice) and the preference or priority defined by the PRL. However, as successive attempts fail, the communications work down through the options for different types of communications via systems identified in the PRL and then to systems not listed in the PRL.

Figure 3:
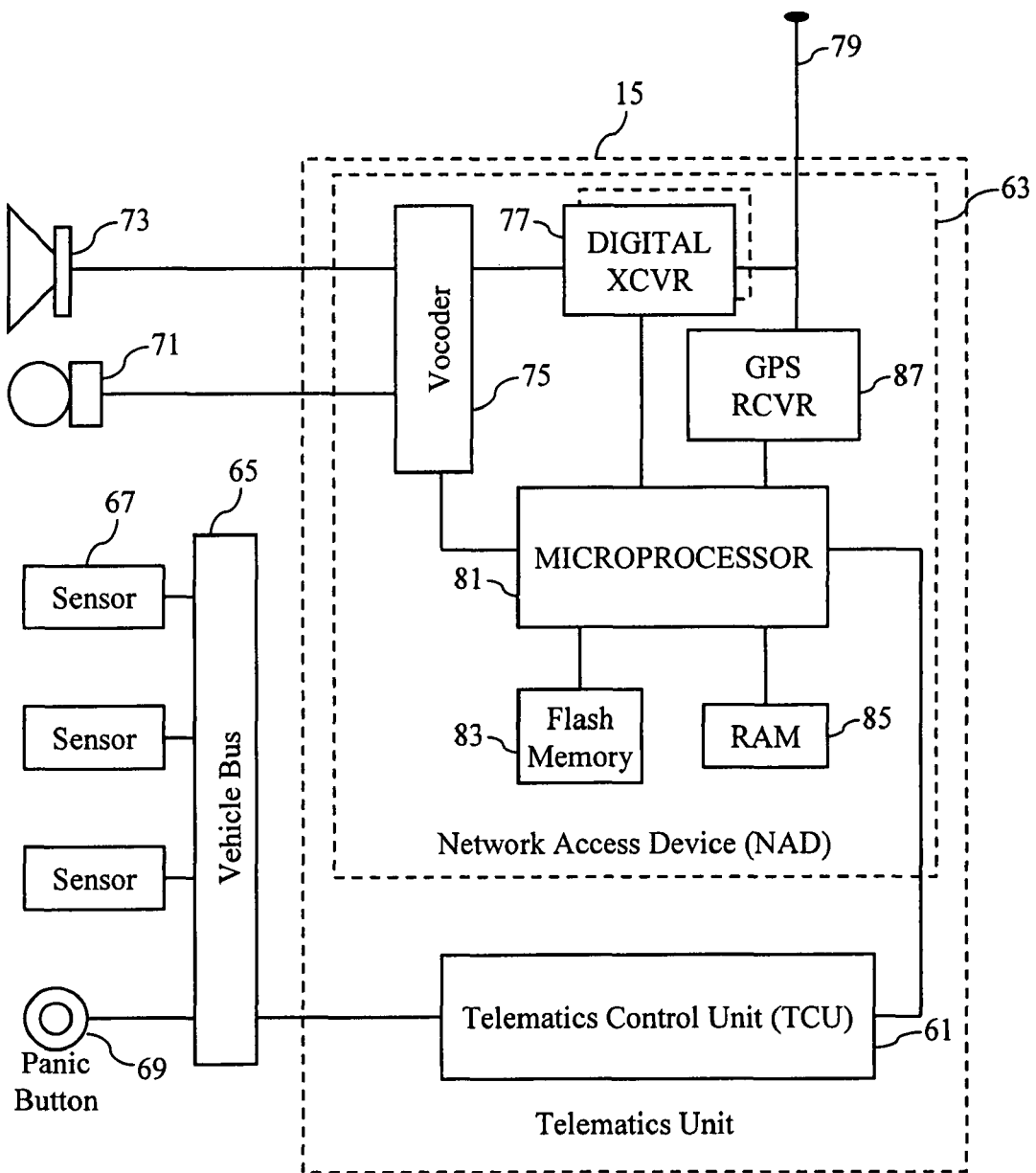
FIG. 3 is a functional block diagram of an exemplary telematics unit, and associated equipment, as may be used in a vehicle application.

FIG. 3 is a functional block diagram of an exemplary telematics unit 15 and associated equipment, as may be used in a vehicle 13 of FIG. 2. The telematics unit 15 includes a telematics control unit (TCU) 61 and a wireless Network Access Device (NAD) 63. The TCU 61 may be implemented as a processor with memories, interfaces and programming to implement the emergency monitoring and notification functions. A vehicle 13 (FIG. 2) typically includes a vehicle bus, shown at 65 in FIG. 3, for providing digital data communications among various on-board devices/systems, particularly for vehicle diagnostics purposes. For crash detection, the vehicle includes one or more sensors 67 for detecting conditions that may relate to a crash, and the vehicle bus 65 provides the continuous electrical connection within the vehicle for the communication of diagnostics data from the sensors 67 to the TCU 61. The TCU 61 is programmed to process data received from the sensors 67 to determine if there has been a crash and to generate data regarding the detected crash, e.g. to indicate severity. The vehicle may also include a panic button 69, coupled to communicate with the TCU 61 via the vehicle bus 65. A vehicle occupant would activate the panic button 69 in the event of a condition that the occupant perceives as an emergency. The TCU 61 determines that there has been an emergency event warranting an automatic report to the TSP call center, in response to crash detection from the processing of the data from the sensor(s) 67 or in response to activation of the panic button 69. In response to any determination of an emergency, the TCU 61 activates the NAD 63 to initiate the communication with the TSP call center. The NAD 63 acts as the communications tool for entry to the wide area wireless network via cellular communications.

The NAD 63 is a wireless transceiver unit configured for communications via various public mobile or wireless communication facilities and associated landline facilities that make up the system 10 of FIG. 2. The NAD 63 is generally similar to a wireless mobile station 11 configured for voice and data communications. It is assumed that those skilled in the art are familiar with the structure and operation of mobile stations and thus with the structure and operation of generally similar devices that may be used to implement the NAD 63. To insure a full understanding by all readers, however, it may be helpful to consider a high level summary review of the relevant structure of one example of a NAD.

The NAD 63 supports both data communication and voice communication. For the voice communication function, the vehicle will include a microphone 71 for audio signal input and a speaker 73 for audio signal output. The microphone 71 and the speaker 73 connect to voice coding and decoding circuitry (vocoder) 75 within the NAD 61. During a voice telephone type communication with the TSP call center, for example, the vocoder 75 provides two-way conversion between analog audio signals representing speech or other audio and digital samples at a compressed bit rate compatible with the digital protocol of the wireless network communications.

For digital wireless communications, the NAD 63 also includes a digital transceiver (XCVR) 77. The concepts discussed here encompass embodiments of the NAD 63 utilizing any digital transceivers that conform to current or future developed digital wireless communication standards. For example, the transceiver 77 could be an EVDO, TDMA or GSM unit designed for cellular or PCS operation. In the present embodiments, the digital transceiver 57 is a CDMA transceiver compatible with operation via an IS-95 network or a 1x-RTT network, to provide both voice and/or data communications.

The transceiver 77 provides two-way wireless communication of information, such as vocoded speech samples and digital message information. The transceiver 77 also sends and receives a variety of signaling messages in support of the various communications provided via the NAD 63 and the various wireless network facilities. These signaling messages, for example, also enable SMS communications. The transceiver 77 connects through RF send and receive amplifiers (not separately shown) to an antenna 79. The NAD 63 may include one or more additional transceivers, as shown in dotted line form, for operation in an analog mode or in accord with an alternative digital standard, such as EVDO.

A microprocessor 81 acts as a controller for controlling all operations of the NAD 63. The microprocessor 81 is a programmable controller. The NAD 63 also includes flash type program memory 83 and/or a non-volatile random access memory (RAM) 85, for storing various software routines and mobile configuration settings, for use by the microprocessor 81

A portion of the memory 83 is designated as a number assignment module (NAM). The NAM stores the mobile identification number (MIN) or mobile directory number (MDN), which is the directory number assigned to a mobile station, or in this case to the NAD 63 in the telematics unit 15. Another portion of the memory 83 stores the preferred roaming list (PRL), which contains the SIDs of systems operated by the customer's wireless service provider or systems of one or more other providers with which that provider has established favorable roaming agreement (roaming "partners"). Initial provisioning entails appropriate programming of the network elements to support services through the customer's wireless service provider's own network and may include some programming of the particular telematics unit 15, e.g. to store its assigned mobile directory number (MDN) and the appropriate PRL data in the flash memory 83.

The actual emergency dialing program implemented by the telematics unit may be stored in the flash memory 83 of the NAD 63. Alternatively, this programming may be stored in program memory of the TCU 61.

For position determination, the NAD 63 also includes a GPS receiver 87. Under control of the microprocessor 81, the GPS receiver 87 receives and processes signals from one or more satellites of the GPS constellation of GPS satellites. From its processing, the GPS receiver 87 supplies GPS data to the microprocessor 81, such as pseudorange measurements and associated PN codes for measured satellite signals. Associated computations may be performed in the microprocessor or by a processor or the like included in the GPS receiver, or the data may be forwarded to equipment at the TPS call center for processing to obtain a final fix (latitude and longitude coordinates) as to the location of the vehicle 13.

The structure and operation of the telematics unit 15 with the TCU 63 and the NAD 63, as outlined above, were described to by way of example, only. Those skilled in the art will recognize that the telematics unit 15 may be implemented and may operate in a variety of other ways.

Figure 4A:
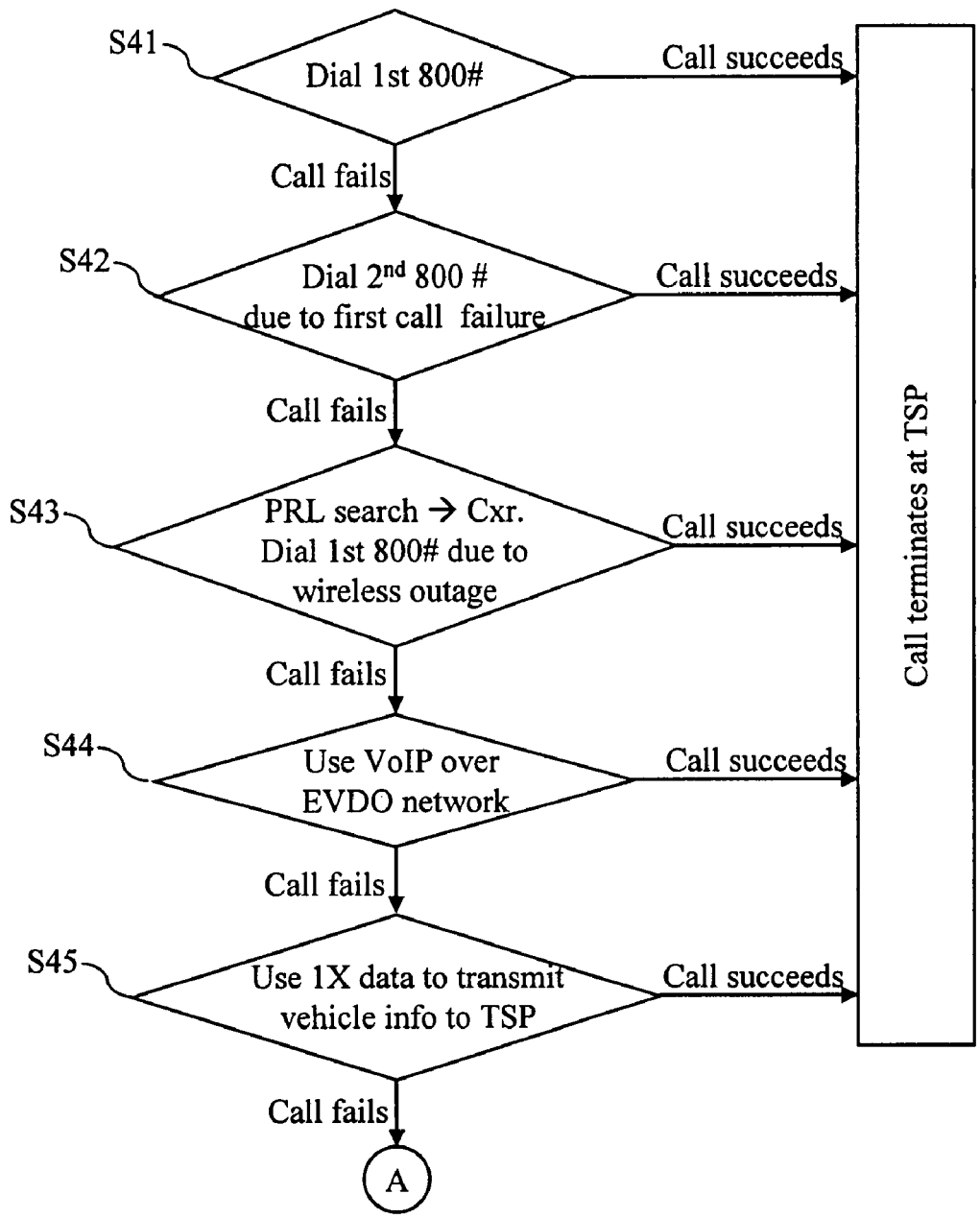
FIGS. 4A and 4B together form a flow chart of an emergency communication process, having a more comprehensive scheme for overcoming potential communication failures.
Figure 4B:
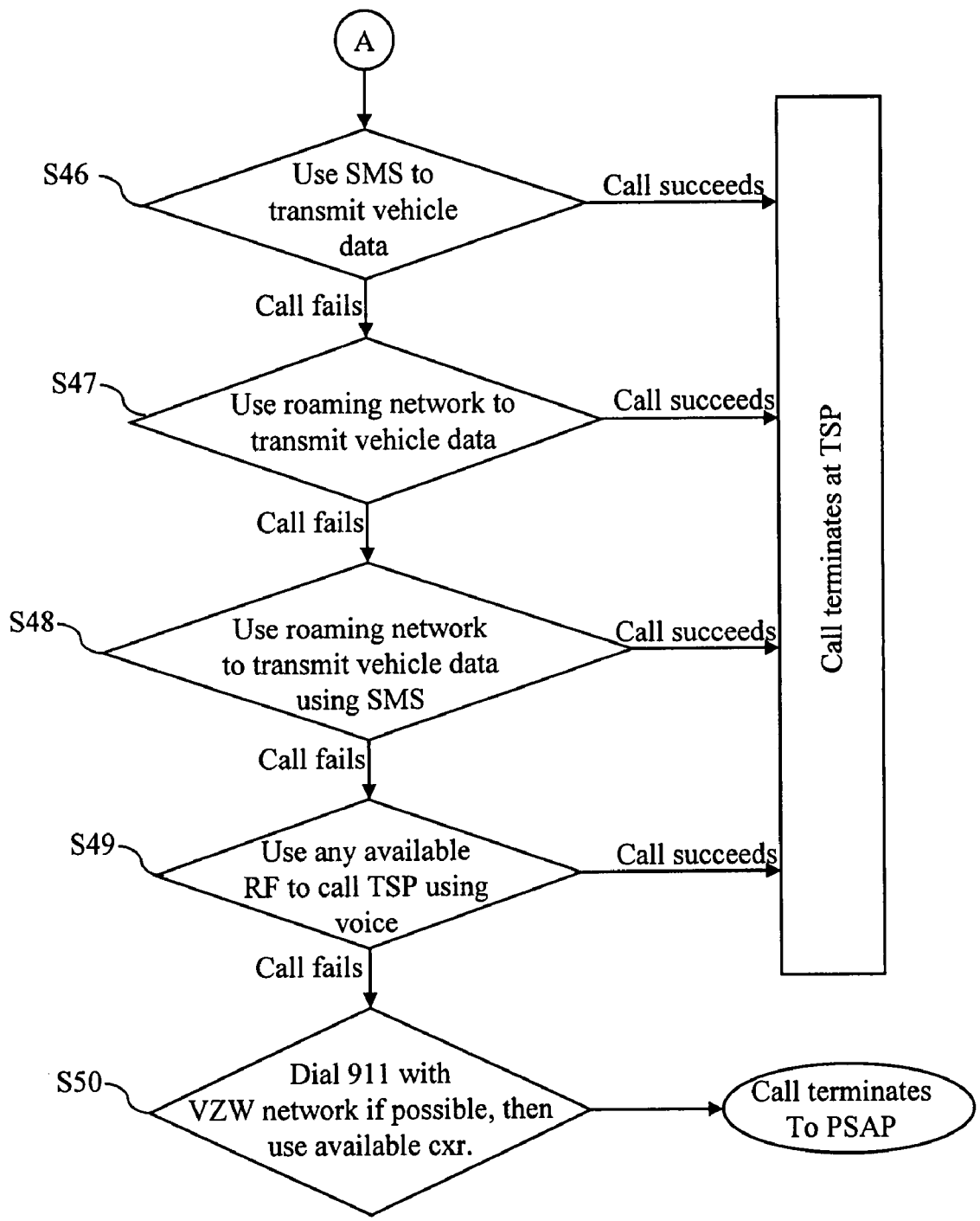

FIGS. 4A and 4B form a flow chart of an emergency communication process, having a more comprehensive scheme for overcoming potential communication failures.

Figure 5:
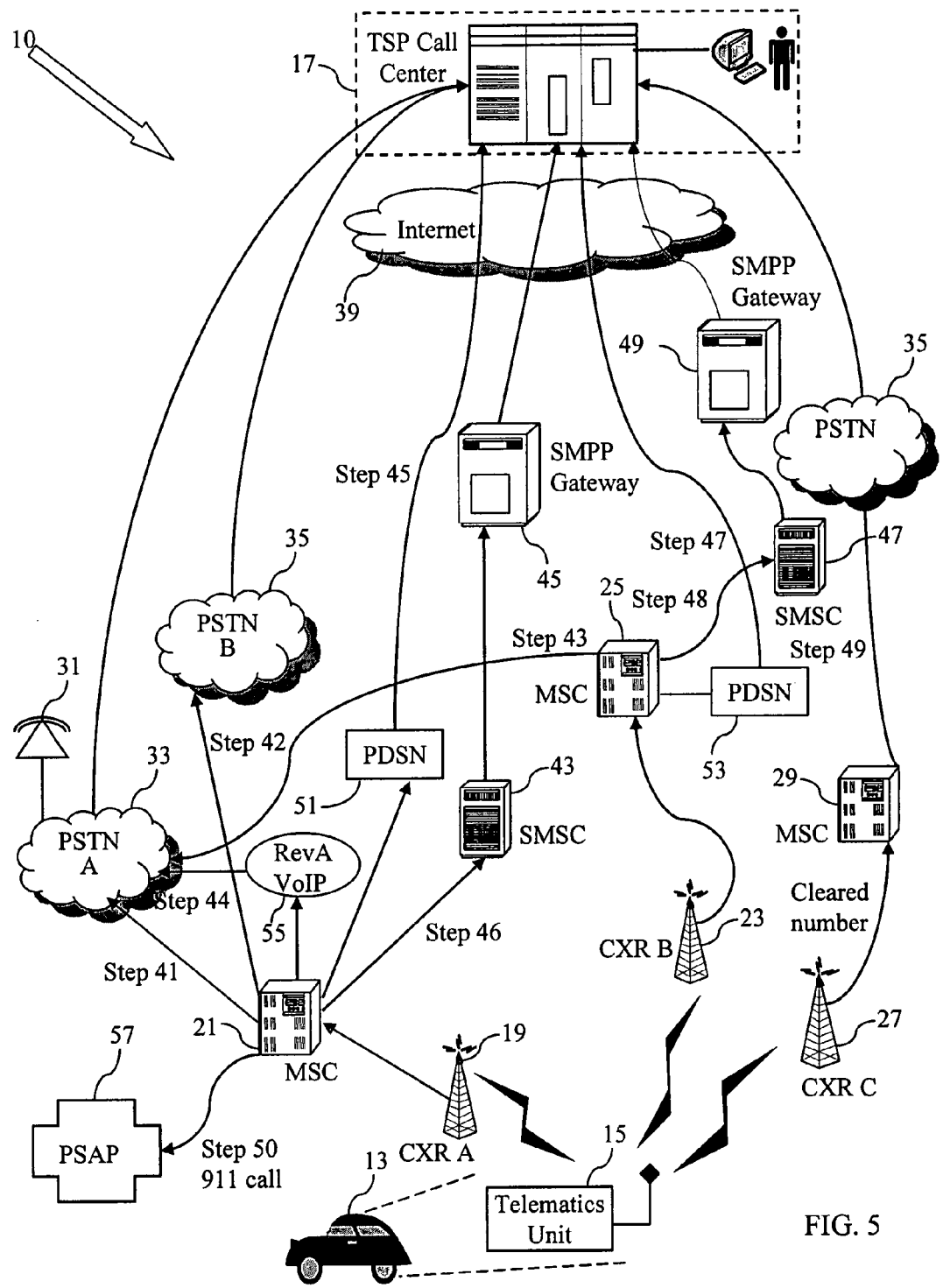
FIG. 5 is a functional block diagram similar to FIG. 2 but overlaid with arrowheads and with numbers of steps from the process of FIGS. 4A and 4B, to help illustrate the different attempts to complete communications from a telematics unit to a telematics service provider's call center.

FIG. 5 in turn provides an overlay of the steps of FIGS. 4A, 4B on system diagram similar to that of FIG. 2. The example of FIGS. 4A, 4B and 5 essentially illustrates a 10-step progressive or hierarchical approach for successive emergency communication attempts. The process flow successively progresses from a most preferred communication, through a series of increasingly less preferred communication options to a least preferred (last resort) communication.

The actual detection of an emergency condition is omitted from FIG. 4A for simplicity, so the illustrated processing begins at step S41 with a first wireless call attempt at a voice call to the TSP service center. This first call uses the PRL to select a system 19, 21 of a primary wireless service provider CXR A, i.e. a system of the home service provider or a system of a partner of the home provider offering the most preferred roaming terms, for the particular location of the telematics unit 15. The telematics unit 15 will make the first call by dialing a first existing 800 number as a first destination number for the TSP call center 17. The first 800 number directs the first call to the TSP call center via a landline facility of a first landline carrier, PSTN A 33 in the example of FIG. 5. The call attempted at S41 in FIG. 4A corresponds to that made at S2 in the example of FIG. 1.

For simplicity of illustration, separate determination steps are omitted in FIGS. 4A and 4B. However, processing in relation to the first call attempt does involve determining whether or not the first wireless call attempt successfully completes the first call to the TSP call center 17. For a voice call, this may entail monitoring the supervision related signaling for the call to determine if there is an answer within a set period of time from the start of the call. The telematics unit 15 may also look for a positive response, e.g. handshaking and/or acknowledgement data message from data equipment at the call center 17. If the first call successfully reaches the TSP call center, the telematics unit 15 communicates data relating to the emergency, after which, a TSP representative at the call center 17 can conduct a voice communication with a person at the location of the telematics unit 15, e.g. an occupant of the vehicle 13.

However, if the first wireless call attempt is unsuccessful, e.g. no answer within a set interval, then the process flow branches to step S42. In step S42, the telematics unit 15 initiates a second wireless call attempt. This second call again uses the PRL to select a system 19, 21 of the primary wireless service provider CXR A for the location of the telematics unit, but for the second call, the telematics unit dials a different second 800 number as the destination number for the TSP call center. The second 800 number directs the second call to the TSP call center via a landline facility of a second landline carrier different from the landline facility of the first landline carrier, that is to say the PSTN B 35 in the illustrated example (FIG. 5). Hence, although the second call uses the same wireless facility for the second voice call, the second call utilizes a different landline facility. If the first call failed due to a problem with the first landline facility PSTN A 33, the second voice call may avoid that problem and succeed in reading the TSP call center 17.

Processing in relation to the second call attempt in S42 involves determining whether or not that wireless call attempt successfully completes the first call to the TSP call center 17, in a manner similar to the determination made in relation to the first wireless voice call attempt. If the second call successfully reaches the TSP call center 17, the telematics unit 15 communicates data relating to the emergency, after which, a TSP representative at the call center can conduct a voice communication with a person at the location of the telematics unit 5.

However, if the second call attempt is unsuccessful, e.g. no handshaking with the data equipment at the call center, it is likely that the cause of the failures is endemic to the wireless voice facility through 19 or 21 of the primary service provider CXR A serving the location of the telematics unit 15. Hence, subsequent attempts at communication bypass that wireless voice facility. In the example, in the event of a second failed attempt, the process flow branches from S42 to step S43. Further processing next makes one or more attempts at alternate options for voice and data communication with the TSP call center 17, using alternate wireless voice call facilities.

In the illustrated example, S43 is the first attempt to access a less preferred wireless network facility. Here, the telematics unit 15 scans the air-waves for another wireless system 23, 25 having a SID on the PRL list but designated as less preferred, essentially, in order to access a wireless facility of a service provider CXR B other than that of the primary provider CXR A and thereby avoid potential failures due to problems associated with the primary provider's wireless system 19, 21. If the scanning finds such an alternate network resource in proximity to the telematics unit 15, the telematics unit 15 will make the call in S44 by dialing one of the 800 numbers as a destination number for the TSP call center 17. Either 800 number could be used, but the example uses the first 800 number, so in the example of FIG. 5, the MSC 25 routes this voice call via the PSTN A 33.

In a manner analogous to the processing in steps S41 and S42, the processing in step S43 involves determining whether or not that wireless call attempt successfully completes the call to the TSP call center 17. If the call in step S44 successfully reaches the TSP call center 17, the telematics unit 15 communicates data relating to the emergency, after which, a TSP representative at the call center can conduct a voice communication with a person at the location of the telematics unit.

In the example, the processing at step S44 is an attempt to initiate a data communication via a packet data session in a manner that would support both voice and data. In a typical implementation, this might entail scanning for network system identifiers on the PRL for systems that offer Evolution Data-Optimized (EVDO) type service, and if detected, initiating a packet data communication session through the detected EVDO type wireless network. Although shown at 55 as a feature of the network of the primary carrier CXR A, the VoIP functionality may be implemented on another wireless provider's system. Once a packet data session is established through the wireless EVDO network, the telematics unit 15 would attempt to send packet data through a public or private network (Internet or Intranet) to the TSP call center 17. The EVDO network supports both data and voice over packet communications, therefore, the telematics unit 15 may be able to contact the TSP and send data and allow voice communication, in a manner analogous to a successful voice call using VoIP 55. Of course, for this scenario, the TSP call center equipment would have appropriate packet data communications equipment coupled to the public or private data network, e.g. for data/text messaging and voice over Internet protocol (VoIP) communications.

The illustrated example assumes that the wireless facilities for the voice calls in steps S41 and S42 utilize circuit switched technology. In most locations, a provider offering service via an EVDO system would likely be a different provider than would offer the circuit switched facilities for voice calls. Hence, the EVDO call attempt also is an attempt to access a facility of another alternate wireless service provider, in this example.

Processing in relation to the data and voice packet communication attempt in step S44 also involves determining whether or not that attempted communication is successful. Here, the data protocols set-up for initial handshaking between the telematics unit and the equipment at the TSP call center 17 would include one or more messages sent from the center to the telematics unit 15. The protocols may also include one or more positive acknowledgements from the call center, e.g. upon completion of the handshaking (when instructing the telematics unit 15 to send emergency data) or upon successful receipt of the emergency related data. Timely receipt of the appropriate handshaking signal(s) corresponds to successful set-up of a data session, after which the telematics unit 15 sends emergency related data. After successful data transmission, the communication could change over to VoIP to allow a person at the call center 17 to conduct a voice communication with a person at the location of the telematics unit 15.

Failure to timely receive the appropriate handshaking signal(s) and/or to timely receive a positive acknowledgement if required could be detected as a failure of this communication attempt at S43. If it is determined that this attempt is unsuccessful, then the process flow branches to step S45.

To this point in the process, all of the attempts have pointed to facilities that support voice communications and typically allow communication of data as well. However, if the latest wireless call attempt is unsuccessful, e.g. no answer and/or no handshaking within a set interval, one or more subsequent attempts will try to communicate relevant data only. Hence, upon failure of the call attempt at S44, the process flow branches to step S45, which is the first of several attempts to use non-voice facilities to communicate data about the emergency to the TSP call center 17. In step S45, the telematics unit 15 uses the PRL and scans the air-waves to identify a wireless communication system offering data communication services. Such wireless services normally offer various messaging and multimedia services to mobile station users. The PRL related processing will pick the system offering the data service that has the highest priority on the PRL, among the one or more offering such a service at the location of the telematics unit. The selected system may be a system of the same primary provider CXR A as in steps S41 and S42, a system of the alternate provider CXR B selected in step S43 or a system of yet another provider on the PRL in the particular area, depending on which provider systems offer voice or data service in that area. For the emergency communication at S45, the telematics unit 15 initiates a data communication log-on procedure through the selected mobile communication system, say 19, 21 and 51 in the example of FIG. 5. If log-on is successful at the PDSN 51, the selected system sets up a data communication session through that wireless network, e.g. to the Internet 39; and the telematics unit 15 attempts to initiate a data communication with the TSP call center equipment.

Again, the processing determines whether the communication (at S45) fails or is successful. If successful, e.g. after initial data communication with the TSP call center through the data session through the selected wireless mobile communication system, the telematics unit 15 sends data relating to the detected emergency to the call center equipment. Failure may occur if the telematics unit 15 can not log-on to the detected wireless communication system, or there may be some failure in establishing a data link to the TSP call center 17. If for one of these reasons, or for some other reason, it is determined that the data communication attempt at S45 is unsuccessful, then the processing branches to step S46 (FIG. 4B).

Many wireless service providers now offer SMS as a text messaging service via their mobile communication networks. SMS, however, utilizes signaling resources rather than voice call resources. Hence, where there is voice congestion or failure focused on voice resources, the signaling resources may still be available. Hence, the next attempt at communication in step S46 is an attempt to send an SMS message to the TSP call center 17.

In step S46, the telematics unit uses the PRL and scans the air-waves to identify the most preferred wireless communication system in the area (primary or alternate from the PRL) that appears to offer SMS. In the example of FIG. 5, the unit selects the system of CXR A. Then, it uses the identification of that system to attempt an SMS communication. Essentially, the telematics unit 15 compiles at least one text message containing data related to the emergency. If there is more data than will fit within one SMS message, it may be necessary to send one or more additional messages, however, for ease of discussion, we will assume a single SMS message will suffice. The SMS message is addressed to the TSP call center 17, e.g. in a manner analogous to sending an SMS text message to a party outside the mobile communication network(s) via the Internet or the like.

The NAD 63 of the telematics unit 15 sends the SMS message containing the emergency related data upstream via a signaling channel over the airlink, and the selected wireless network uses its out-of-band signaling resources to transport the message to the SMSC, that is to say the SMSC 43 is our example. The SMSC 43 forwards the message to an SMPP gateway 45 to an Internet Protocol (IP) packet data network such as Internet 39, for packet routing to the addressed destination, in this case, a server or terminal device at the TSP call center 17 for output to TSP personnel.

To allow the telematics unit 15 to determine if the SMS communication attempt is successful, the equipment at the TSP call center 17 may be configured to automatically send an SMS message back upon successful receipt of the SMS message with the data from the telematics unit. Such a response would provide a positive acknowledgement of the SMS message from the telematics unit 15, if the SMS communication is successful. The telematics unit 15 in turn could detect failure, in the event that it either fails to establish normal SMS communications through to the SMSC or it fails to receive the positive SMS acknowledgement within a set time following its attempt to transmit to the SMSC.

Hence, in the illustrated process flow, if the upstream SMS message gets through and is received at the TSP call center 17, the equipment at the center will respond by sending back a responsive acknowledgement as another SMS message, in this case addressed back to the telematics unit 15. Specifically, the equipment at the center sends the response as at least one IP packet addressed to the telematics unit 15 back through the Internet 39 to the SMPP gateway 45, which converts it to the protocol used for SMS and forwards it to the SMSC 43. The SMSC 43 receives the text acknowledgement message and forwards it as an SMS message via the signaling resources through MSC 21, base station 19 and over the signaling channels to the appropriate destination, in this case to the telematics unit 15. If received within the applicable time period, the telematics unit 15 determines that the SMS data communication attempt was successful from receipt of the SMS type acknowledgement message.

However, if the telematics unit determines that the SMS data communication attempt at step S46 was unsuccessful, it extends its processing to step S47. Step S47 is an attempt to conduct a data communication, and step S48 is another attempt to communicate data via SMS message transmission in the event data communication at S47 fails. These steps S47-S48 are generally similar to the communications in steps S45 and S46, except that in S47 and S48 the telematics unit 15 will select a system of a less preferred alternate carrier from the PRL (if available) than was done in the earlier steps. Thus, in step S47, the telematics unit 15 uses the PRL to select a different network, e.g. that of CXR B, the unit registers on and attempts to transmit the emergency related data to the call center 17 using that selected network's data communication service through PDSN 53 and the Internet 39. Again, there is a determination if the data communication is now successful, and if not, then the processing extends to step S48. At S48, the telematics unit 15 uses the PRL to select a network different from that used in step S46, say that of CXR B and the unit 15 attempts to send an SMS transmission of the emergency related data to the TSP call center 17 via that network. Again, there is a determination if the SMS data communication is now successful, and if not, then the processing extends to step S49.

The processing to this point (through S48) has relied on the PRL to select wireless facilities, of the primary service provider, of a one or more alternate providers albeit less preferred, of a provider for data and voice packet service and/or for one or more systems providing non-voice facilities for data reporting. To reach S49, all such facilities have proven unavailable or have failed to provide a successful communication to the TSP call center 17. Hence, further processing (S49-S50) in our example will no longer rely on the PRL, in further efforts to avoid the causes of the failures and establish emergency communications. The further attempts will involve at least an attempt to initiate a voice call using whatever other wireless network facility the telematics unit 15 can detect at its current location (S49). The call at S49 would use either 800 number, and except for the selection of the non-PRL system of CXR C through 27, 29 and 33, would be generally similar to the earlier discussed voice call attempts.

As in the other illustrated processing steps, the processing related to the communication attempt of step S49 involves determining whether or not that attempt to establish wireless voice communication with the call center is successful. If successful, then the telematics unit 15 at least enables a voice communication between a person manning the call center and a person at the site of the emergency as detected by the telematics unit. If the completed voice call provides sufficient quality, the telematics unit 15 may also send the emergency related data as in earlier steps such as S41. Although not shown, additional steps could be provided to attempt data communications and/or SMS messaging through the non-PRL system(s), analogous to steps S45-S48 but using a system not identified in the PRL.

In the example, if the voice call attempt at step S49 also fails, then processing branches to step S50. As in the example of FIG. 1, the second processing example is configured to offer a final fall-back to a 911 call directly to a public safety answering point (PSAP). Hence, in step S50, the telematics unit 15 uses whatever wireless resources are available at its location, particularly any systems that the telematics has not previously tried to utilize. Via that last selected wireless facility, the telematics unit 15 attempts to initiate an emergency call to the PSAP 57.

As outlined above, some of the hierarchical strategy for telematics emergency communications relies of use of the home wireless service providers' PRL. Such a PRL enables each mobile station or telematics unit device to select preferred wireless communication service providers to use when a station or unit is outside of the carrier's wireless communication network. Through mergers, the creation and termination of contracts, and other business procedures, a carrier's relationships with other wireless communication service providers changes over time. As a result of changing business relationships, PRLs change. In many cases today, the wireless service provider is able to program the latest version of the PRL into new mobile stations 11, and the service provider is able to update existing mobile stations 11 with the latest version of the PRL as well using over-the-air programming techniques. PRLs would be similarly programmed into and updated from time to time in the telematics units 15, either in the TCU 61 or more likely in the memory 83 in the NAD 63. The over the air programming may also offer options to update executable programming of mobile stations, and thus may enable program updates for the telematics units.

Hence, operations described above may be carried out by execution of programming code in the form of software, firmware, or microcode running on controllers of the telematics units 15. The software functionalities involve programming, including executable code as well as associated stored data (e.g. the PRL), for causing a telematics unit 15 to implement a hierarchy of communication attempts when a need for an emergency call arises, as exemplified by the discussions above. Code for implementing the emergency call processing and the attempts via the various alternate facilities in the event of failure(s) of primary facilities may be in the form of computer instruction in any form (e.g. source code, object code, interpreted code, etc.) stored in or carried by any computer or machine-readable medium. In operation, the executable code is stored within the respective telematics unit 15. At other times, however, the programming may be stored at other locations and/or transported for loading into respective equipment, e.g. into the particular telematics unit from a server or the like.

Hence, implementations of the teachings presented herein typically involve one or more software products in the form of one or more modules of executable code and/or data carried by at least one machine readable. Execution of such code by a processor or the like of a telematics unit causes the unit for example to implement steps such as outlined above in the discussion of the exemplary call flows.

As used herein, terms such as computer or machine "readable medium" refer to any medium that participates in providing instructions and/or data to a processor. Such a medium may take many forms, including but not limited to, non-volatile media, volatile media, and transmission media. Non-volatile media include, for example, optical or magnetic disks, such as flash memory 83 of the NAD 63 in the telematics unit 15 of FIG. 3 as well as storage devices in any server or computer(s), switches or routers that may be used to store programming for downloading into telematics units. Volatile media include dynamic memory, such as RAM in the telematics unit or main memory of a computer platform of a mobile PC or of a program server. Physical transmission media include coaxial cables; copper wire and fiber optics, including the wires that comprise a bus within a computer system/server. Carrier-wave transmission media can take the form of electric or electromagnetic signals, or light waves, such as those generated during radio frequency (RF) and infrared (IR) data communications over wireline and wireless links of the various providers' networks. Many of these forms of computer readable media may be involved in carrying one or more sequences of one or more instructions to a processor for storage and/or execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An emergency communication method, comprising steps of:
   (a) detecting a condition signifying an emergency;
   (b) responsive to the detecting of the condition signifying the emergency, attempting a first wireless call directed to a call center of a telematics service provider, via a wireless voice communication facility of a primary wireless service provider, using a first destination telephone number for the call center configured to direct the first call to the call center via a landline facility of a first landline carrier;
   (c) determining whether or not the first wireless call attempt successfully completes the first call to the call center;
   (d) in response to successful completion of the first call to the call center, enabling data and voice communication via the wireless voice communication facility of the primary wireless service provider and the landline facility of the first landline carrier;
   (e) in response to determining that the first wireless call attempt has not successfully completed the first call to the call center, attempting a second wireless call directed to the call center, via the wireless voice communication facility of the primary wireless service provider, using a second destination telephone number different from the first destination telephone number, the second destination telephone number being configured to direct the second call to the call center via a landline facility of a second landline carrier different from the landline facility of the first landline carrier, the second landline carrier being different from the first landline carrier;
   (f) determining whether or not the second wireless call attempt successfully completes the second call to the call center;
   (g) in response to successful completion of the second call to the call center, enabling data and voice communication via the wireless voice communication facility of the primary wireless service provider and the landline facility of the second landline carrier;
   (h) in response to determining that the second wireless call attempt has not successfully completed the second call to the call center, attempting a third wireless call directed to the call center, via a wireless voice communication facility of another wireless service provider different from the wireless voice communication facility of the primary wireless service provider, the other wireless service provider being different from the primary wireless service provider;
   (i) determining whether or not the third wireless call attempt successfully completes the third call to the call center;
   (j) in response to successful completion of the third call to the call center, enabling data and voice communication via the wireless voice communication facility of the other wireless service provider;
   (k) in response to determining that the third wireless call attempt has not successfully completed the third call to the call center, attempting to establish a wireless data communication with the call center, using a non-voice wireless communication facility;
   (l) determining whether or not the attempt to establish wireless data communication with the call center is successful; and
   (m) in response to successful establishment of wireless data communication with the call center, sending data related to the emergency to the call center.

2. The method of claim 1, wherein facilities of one or more wireless service providers are selected in accord with a preferred roaming list (PRL).

3. The method of claim 2, wherein the attempt to establish wireless data communication in step (k) comprises attempting to establish a packet session via a packet communication service offered by the primary wireless service provider or an alternate wireless service provider, identified in the PRL.

4. The method of claim 2, wherein the attempt to establish wireless data communication in step (k) comprises sending a short message service message via wireless service offered by the primary wireless service provider or an alternate wireless service provider, identified in the PRL.

5. The method of claim 2, wherein at least one of the attempts involves an attempt to establish communication via a wireless service facility not identified in the PRL.

6. The method of claim 5, wherein the attempt to establish wireless data communication in step (k) comprises attempting to establish a packet session via a packet communication service offered via a wireless service facility not identified in the PRL.

7. The method of claim 5, wherein the attempt to establish wireless data communication in step (k) comprises sending a short message service message via wireless service offered via a wireless service facility not identified in the PRL.

8. The method of claim 1, further comprising initiating an emergency call to a public safety answering point, in response to determining that the establishment of wireless data communication with the call center is unsuccessful.

9. A telematics system, comprising:
   a wireless transceiver for wireless communications via mobile communication networks;
   one or more elements for detecting a condition signifying an emergency; and
   at least one processor coupled to the wireless transceiver and responsive to indication of the emergency detection by the one or more elements,
   wherein the at least one processor is configured to give the telematics unit the capabilities to:
   (a) responsive to detection of the condition signifying the emergency, attempt a first wireless call directed to a call center of a telematics service provider, via a wireless voice communication facility of a primary wireless service provider, using a first destination telephone number for the call center configured to direct the first call to the call center via a landline facility of a first landline carrier;
   (b) determine whether or not the first wireless call attempt successfully completes the first call to the call center;
   (c) in response to successful completion of the first call to the call center, enable data and voice communication via the wireless voice communication facility of the primary wireless service provider and the landline facility of the first landline carrier;
   (d) in response to determining that the first wireless call attempt has not successfully completed the first call to the call center, attempt a second wireless call directed to the call center, via the wireless voice communication facility of the primary wireless service provider, using a second destination telephone number different from the first destination telephone number, the second destination telephone number being configured to direct the second call to the call center via a landline facility of a second landline carrier different from the landline facility of the first landline carrier, the second landline carrier being different from the first landline carrier;

(e) determine whether or not the second wireless call attempt successfully completes the second call to the call center;

(f) in response to successful completion of the second call to the call center, enable data and voice communication via the wireless voice communication facility of the primary wireless service provider and the landline facility of the second landline carrier;

(g) in response to determining that the second wireless call attempt has not successfully completed the second call to the call center, attempt a third wireless call directed to the call center, via a wireless voice communication facility of another wireless service provider different from the wireless voice communication facility of the primary wireless service provider, the other wireless service provider being different from the primary wireless service provider;

(h) determine whether or not the third wireless call attempt successfully completes the third call to the call center;

(i) in response to successful completion of the third call to the call center, enable data and voice communication via the wireless voice communication facility of the other wireless service provider;

(j) in response to determining that the third wireless call attempt has not successfully completed the third call to the call center, attempt to establish a wireless data communication with the call center, using a non-voice wireless communication facility;

(k) determine whether or not the attempt to establish wireless data communication with the call center is successful; and (l) in response to successful establishment of wireless data communication with the call center, send data related to the emergency to the call center.

10. A product, comprising: a non-transitory machine readable storage medium and a program embodied in the medium, wherein execution of the program by a controller of a telematics unit makes the telematics unit capable of implementing functions to:

(a) detect a condition signifying an emergency;

(b) responsive to the detection of the condition signifying the emergency, attempt a first wireless call directed to a call center of a telematics service provider, via a wireless voice communication facility of a primary wireless service provider, using a first destination telephone number for the call center configured to direct the first call to the call center via a landline facility of a first landline carrier;

(c) determine whether or not the first wireless call attempt successfully completes the first call to the call center;

(d) in response to successful completion of the first call to the call center, enable data and voice communication via the wireless voice communication facility of the primary wireless service provider and the landline facility of the first landline carrier;

(e) in response to determining that the first wireless call attempt has not successfully completed the first call to the call center, attempt a second wireless call directed to the call center, via the wireless voice communication facility of the primary wireless service provider, using a second destination telephone number different from the first destination telephone number, the second destination telephone number being configured to direct the second call to the call center via a landline facility of a second landline carrier different from the landline facility of the first landline carrier, the second landline carrier being different from the first landline carrier;

(f) determine whether or not the second wireless call attempt successfully completes the second call to the call center;

(g) in response to successful completion of the second call to the call center, enable data and voice communication via the wireless voice communication facility of the primary wireless service provider and the landline facility of the second landline carrier;

(h) in response to determining that the second wireless call attempt has not successfully completed the second call to the call center, attempt a third wireless call directed to the call center, via a wireless voice communication facility of another wireless service provider different from the wireless voice communication facility of the primary wireless service provider, the other wireless service provider being different from the primary wireless service provider;

(i) determine whether or not the third wireless call attempt successfully completes the third call to the call center;

(j) in response to successful completion of the third call to the call center, enable data and voice communication via the wireless voice communication facility of the other wireless service provider;

(k) in response to determining that the third wireless call attempt has not successfully completed the third call to the call center, attempt to establish a wireless data communication with the call center, using a non-voice wireless communication facility;

(l) determine whether or not the attempt to establish wireless data communication with the call center is successful; and (m) in response to successful establishment of wireless data communication with the call center, send data related to the emergency to the call center.

* * * * *